Aug. 8, 1950         LE GRAND H. LULL        2,517,582
TRACTOR MOUNTED VEHICLE LOADER
Filed Aug. 23, 1946        3 Sheets-Sheet 1
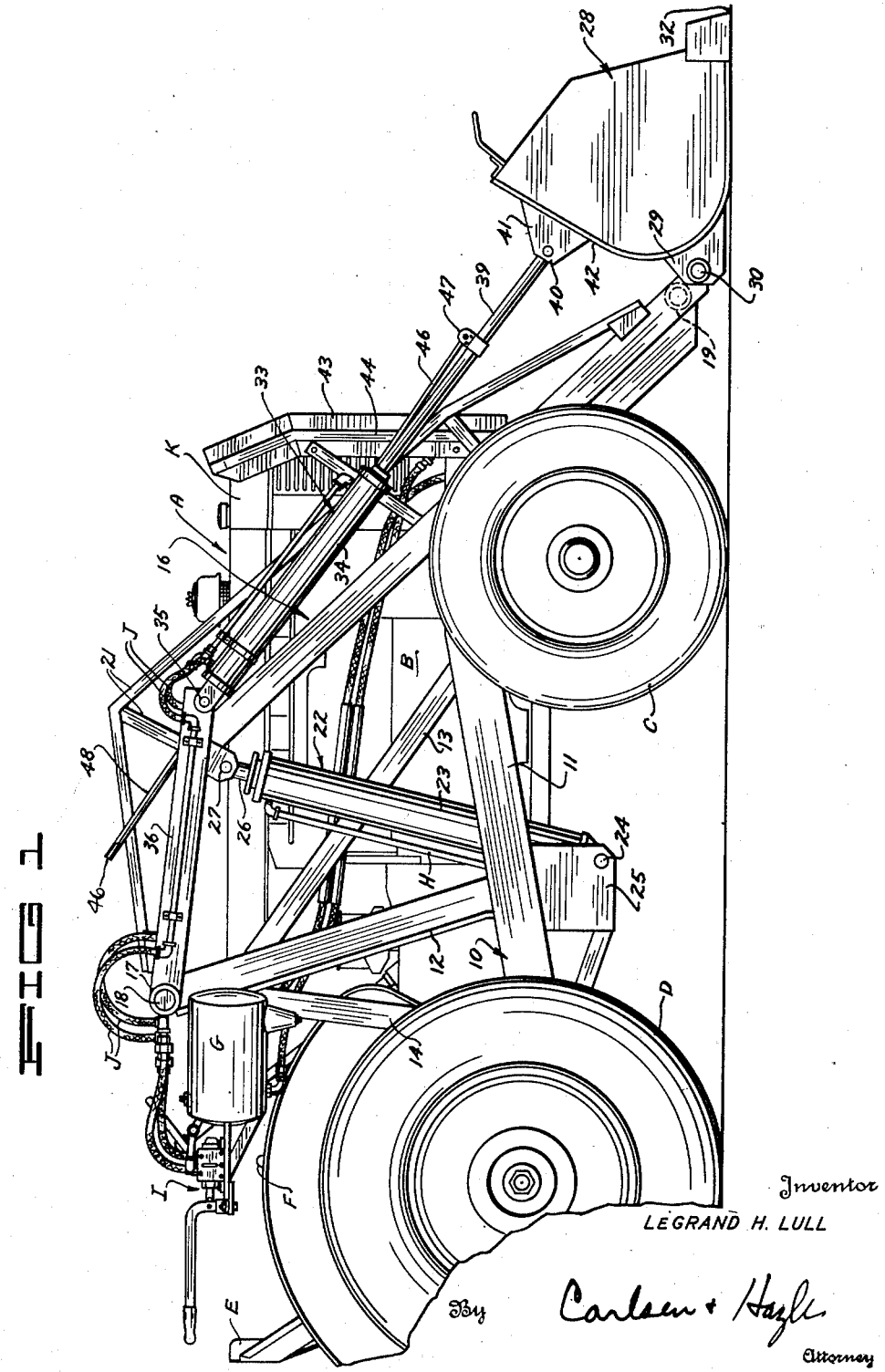
Inventor
LE GRAND H. LULL
By Carlsen + Hazle
Attorney

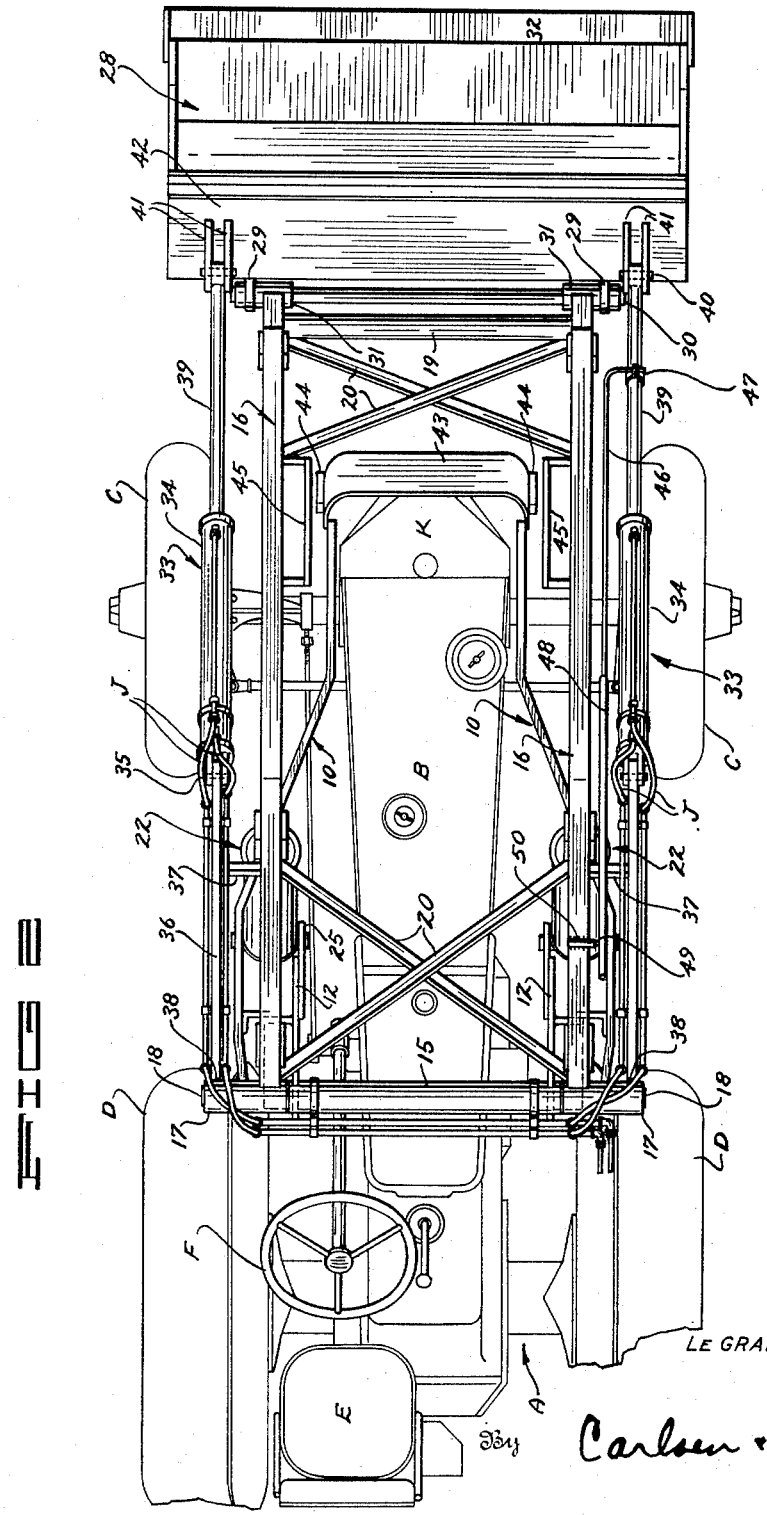

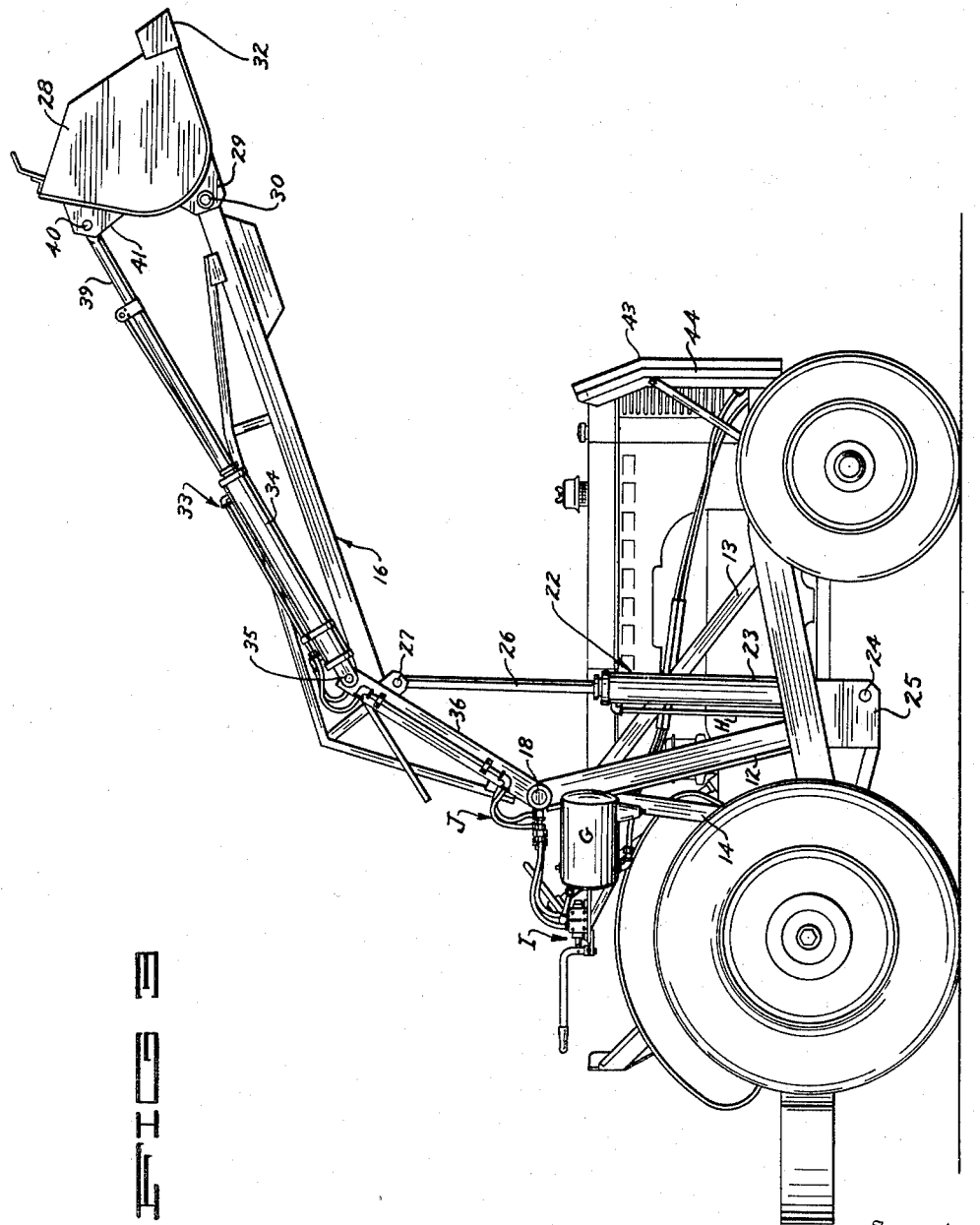

Patented Aug. 8, 1950

2,517,582

UNITED STATES PATENT OFFICE 2,517,582

TRACTOR MOUNTED VEHICLE LOADER

Le Grand H. Lull, Minneapolis, Minn.

Application August 23, 1946, Serial No. 692,482

13 Claims. (Cl. 214—140)

This invention relates to improvements in material loaders and shovels such as used for moving, digging and transporting earth and like purposes, and the primary object is to provide a tractor mounted loader having a shovel or tool, hydraulically operated means for raising and lowering the shovel, and independently controllable hydraulic means for tilting the shovel. I am thus able to use the shovel both for digging up material and for transporting the material. A further object is to provide a loader having a tilting bucket and hydraulic tilt control therefor, along with an indicator visible to the operator on the tractor no matter what the position of the shovel, so that the operator is enabled to control the bucket readily for digging and transporting. Still a further object is to provide a loader having the foregoing characteristics which is simple, strong and practical in construction, and readily applicable to tractors of standard designs.

With these and other objects in view the invention resides in the novel construction and arrangement of parts as hereinafter fully set forth and claimed.

In the drawing:

Fig. 1 is a side elevation of a tractor mounted loader embodying my invention, showing the bucket in a lowered position.

Fig. 2 is a top plan view, a part of the hydraulic system being omitted.

Fig. 3 is another side elevation, on a smaller scale, and showing the bucket in an elevated position.

Referring now more particularly and by reference characters to the drawing, A designates generally a conventional form of tractor upon which my loader may be mounted, it being understood, of course, that by minor changes the loader may be mounted on any conventional design of tractor and that the present showing is for example only. The tractor has the usual engine-chassis assembly B supported by forward steerable wheels C and rear traction wheels D and has a rearwardly located operator's seat or station E, convenient to the steering wheel F.

The loader comprises a mounting frame, designated generally at 10, which includes laterally and longitudinally arranged side beams or members 11 fastened and supported in any appropriate manner upon the tractor A and located inside the wheels C and D thereof. Immediately forward of the tractor wheels D the side beams 11 support inwardly directed side bars 12 braced forwardly and rearwardly as designated at 13 and 14, and the upper ends of the bars 12, as seen in Fig. 2, are joined by a tubular member 15 which crosses above the tractor.

The frame structure just described pivotally supports swinging side arms 16 which at rear ends carry tubular bearings 17 which journal upon pivot pins 18 projecting endwise and laterally from the aforesaid member 15. From these pivot mountings the side arms 16 extend forwardly and then angularly downward to points well ahead of the tractor, and the forward, upwardly and downwardly swingable ends of the arms are rigidly joined by a cross member 19. Also connecting the side arms, so that they will operate as a unit, are diagonal braces 20 (Fig. 2) and the arms are individually stiffened by truss members 21.

The side arms 16 are raised and lowered in unison at forward ends by double action hydraulic lift rams 22 positioned at opposite sides of the tractor. Each such ram 22 comprises an upright cylinder 23 pivotally supported at its lower end upon a transversely extending pin 24 carried by hanger brackets 25 secured to and depending from the side beams 11. Projecting upwardly from the cylinder is a piston rod 26 which is pivotally attached at 27 at its upper end to the associated side arm 16, forwardly of the pivot 18, and the arrangement is obviously such that the selective admission of fluid into opposite ends of the ram cylinder will move the rods 26 upwardly or downwardly, as the case may be, to correspondingly swing the side arms.

The lifting rams 22 are hydraulically actuated by fluid supplied from a pump (not shown) operated by the tractor engine in usual manner, and supplying fluid under pressure to a tank G from which it flows to opposite ends of the ram cylinder through supply lines, one of which appears at H, under control of a valve assembly I located convenient to hand of the tractor operator. Since the precise constructional details of the hydraulic controls per se are immaterial to the present invention it is but briefly described herein.

The side arms constitute a swinging boom assembly whereon a bucket or tool may be carried, and as here shown I provide a more or less conventionally shaped shovel bucket 20 having brackets 29 rigidly affixed on its lower rear corner and apertured to receive a cross pin 30 which is fitted through bearings 31 secured to the forward ends of the side arms 16. The bucket is then tiltably supported for up and down swinging movements at its forward scraping edge 32, as will be clearly apparent.

To then tilt the bucket and support it in adjusted positions, I provide double action tilting rams, designated generally at 33, one at each side arm 16 of the boom assembly. Each ram 33 comprises a cylinder 34 pivotally attached at 35 to a bracket arm 36 secured to and paralleling the rear portions of the arms 16. The arms 36 are rigidly supported, outwardly of the side arms 16, by bars 37 and by fastening the rear ends of the bracket arms to the outer ends of the bearings 17 as shown at 38. The ram cylinders 34 extend forwardly above and outwardly of the side arms 16, and piston rods 39 project from the cylinders toward the bucket. The forward ends of the piston rods 39 are pivotally attached at 40 to brackets 41 secured to the back 42 of the bucket 28 well above the pin 30. Thus it will be evident that the movement, forwardly or rearwardly, of the piston rods 29 will swing the bucket 28 about the transverse axis of the pin 30, and will hold the bucket at any tilted adjustment with respect to the boom assembly.

The piston rods 39 are hydraulically adjusted by the admission of fluid from the tank to the opposite ends of the ram cylinders 34 under control of the valve mechanism I and for this purpose I show fluid lines J connected to the tilting rams.

The forward ends of the side beams 11 support a radiator shield 43 which extends upwardly ahead of the front end of the tractor and at its upper end leans backward over the top of the radiator K, as clearly shown. This shield 43 protects the radiator from dust or falling material in the operation of the loader, and the shield further carries upright guide bars 44 on its sides with which cooperate guides 45 secured to and spaced inwardly from the forward portions of the side arms 16. As seen in Fig. 2 the guides 45 normally clear the bars 44, but these parts will contact each other should there occur any unusual lateral strain on the forward end of the loader and limit the lateral displacement as will be understood.

In operation it will be apparent that the bucket 28 may be raised or lowered and tilted as required to accomplish a multitude of material handling jobs. The shovel may be tilted to the position of Fig. 1 and forced ahead by the tractor to scrape up material and then may be tilted back to hold the accumulated material and elevated to transport, or to load a truck, as in Fig. 3. The load may be dumped then by tilting the bucket forwardly, and due to the separate hydraulic actuations for raising and tilting, the operator will have complete control over the bucket at all times.

It will, of course, be understood that separate valves will be provided in practice for individually controlling the lifting rams 22 and tilting rams 33 so that the bucket 28 may be raised and lowered and tilted as may be required. While only one such valve and its control handle appear in Fig. 1 it is my practice to place these elements immediately alongside each other so that the operator may conveniently actuate the handles as required. However, it is also possible to operate both handles together with one hand and when the bucket is in the position of Fig. 1 and has been thrust into an earth bank, stock pile or the like and has obtained a load of material, both of the valve handles are actuated at once by the operator, in such direction as to admit fluid to all of the rams. Fluid flows toward the lower end of the lift rams 22 and toward the forward ends of the tilting rams 33 when the valves are properly operated and there now occurs an action which is not only of extreme practical advantage but is new in the loader field to my knowledge. Due to a differential in the leverager acting on the lifting and tilting rams, by the comparative distances between the centers 18—27 and 30—40, and the proper relative proportions of the rams themselves, greater initial pressure is required to actuate the lift rams to lift the bucket than to actuate the tilting rams to tilt the bucket upwardly at its forward or receiving edge. Since the hydraulic fluid will take the path of least resistance it follows, then, that the bucket will first be tilted a short distance and then will be elevated, giving me exactly the action necessary to break out the load and prevent spillage without special attention on the part of the operator. The importance of this effect cannot be over emphasized since experience with many of my loaders in actual use has proven its benefits.

As another important feature of my invention I provide an indicator mechanism by which the operator can tell at a glance the angle to which the bucket is tilted. This mechanism comprises an indicator rod 46 which is secured at a forwardly located end to either tilting ram piston rod 39 by a clamp 47. From this point the indicator rod 46 extends rearwardly and is slidably mounted through a sleeve 48 which has an inwardly turned support pin 49 pivotally fitted in a tubular bearing 58 welded on the truss 21, near the rear of the side arm 16. The indicator rod 46 must, of course, travel forwardly or rearwardly with the piston rod 39 which tilts the bucket 28, while the sleeve 48 is fixed against such movement, but may swing as necessary about the axis of the bearing 50 as the rod moves with respect to the sleeve. The position of the rod 46, relative to the rear end of the sleeve 48, thus is indicative of the angle of the bucket and these indicator parts are so proportioned and arranged that when the bottom of the bucket is horizontal in its loading position (Fig. 1), the rear end of the rod 46 is just flush with the rear end of the sleeve 48. It is at this point that the operator most needs the proper indication of the bucket position, since the bucket is largely hidden from his view by the front of the tractor, and the bucket tilt must be properly adjusted so as not to dig too deeply.

Attention is called to the fact that the rear end of the indicator mechanism is located well toward the rear of the loader in clear view from the tractor seat for the maximum of convenience in operation.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. In a tractor mounted loader of the character described, a frame having side beams supported alongside the tractor, upright frame bars supported on the side beams, cross braced and trussed side arms pivoted at rear ends atop the side bars and extending forwardly of the tractor, hydraulically operative lift rams supported at lower ends on the side beams and having upwardly extending piston rods pivoted to the side arms forwardly of the rear end pivots thereof, a bucket pivoted upon the forward ends of the side arms for tilting movements with respect thereto, and hydraulically operative tilting rams connected at rear ends to the side arms adjacent the lift ram pivots and having forwardly extending piston rods pivoted at their forward ends to the bucket above the pivot supports therefor.

2. In a tractor mounted loader of the character described, a frame having side beams supported alongside the tractor, upright frame bars supported on the side beams, cross braced and trussed side arms pivoted at rear ends atop the side bars and extending forwardly of the tractor, hydraulically operative lift rams supported at lower ends on the side beams and having upwardly extending piston rods pivoted to the side arms forwardly of the rear and pivots thereof, a material handling and digging bucket, a pin supported transversely on the bucket at its lower rear portion, bearings on the forward ends of the side arms engaging the pin on the bucket and supporting it for back and forth tilting movements with respect to the side arms, hydraulically operative tilting rams having cylinders connected at rear ends to the side arms and forwardly extending piston rods pivotally attached to the back of the bucket above the bottom thereof.

3. In a tractor mounted loader, a bucket supported forwardly of the tractor for tilting movements, and an indicator rod operatively connected to the bucket for movement by tilting movements of the bucket and extending adjacent the rear of the tractor for indicating by its position the tilt angle of the bucket.

4. In a tractor mounted loader, a bucket supported forwardly of the tractor for tilting movements, and an indicator rod operatively connected to the bucket and extending adjacent the rear of the tractor for indicating by its position the tilt angle of the bucket, and a member slidably engaging and supporting the rear end of the rod and acting as a reference for indicating the position of the rod.

5. In a tractor mounted loader, a vertically swingable boom assembly extending forwardly from the tractor, a bucket tiltably supported on the forward end of the boom assembly, hydraulically operative rams for tilting the bucket and having piston rods connected thereto, and an indicator rod connected to one of said piston rods and extending rearwardly over the tractor to indicate by its position the angle to which the bucket is tilted.

6. In a tractor mounted loader, a vertically swingable boom assembly extending forwardly from the tractor, a bucket tiltably supported on the forward end of the boom assembly, hydraulically operative rams for tilting the bucket and having piston rods connected thereto, an indicator rod secured to one of the piston rods and extending rearwardly over the tractor, and a sleeve slidably supporting the rear end of the indicator rod whereby the position of the indicator rod with respect to the sleeve will indicate the tilt angle of the bucket.

7. In a tractor mounted loader, a vertically swingable boom assembly extending forwardly from the tractor, a bucket tiltably supported on the forward end of the boom assembly, hydraulically operative rams for tilting the bucket and having piston rods connected thereto, an indicator rod secured to one of the piston rods and extending rearwardly over the tractor, and a sleeve slidably supporting the rear end of the indicator rod whereby the position of the indicator rod with respect to the sleeve will indicate the tilt angle of the bucket, the said sleeve being pivotally supported on the boom assembly.

8. In a tractor mounted loader of the character described, a load carrier adapted to be tiltably supported forwardly of the tractor, a fluid motor having an extensible member connected to the load carrier to tilt the same, and an indicator member connected to and movable by the said extensible member for indicating the tilt angle of the load carrier, said indicator member having a part visible from the rear portion of the tractor.

9. In a tractor mounted material carrier and loader of the character described, the combination comprising side beams for mounting alongside the tractor, upright side bars secured on the side beams, cross braced and trussed side arms pivoted at rear ends to the upper ends of the side bars and extending forwardly of the tractor, hydraulically operated lift rams having cylinders secured at lower ends to the side beams and upwardly extending piston rods pivotally attached to the side arms forwardly of the rear end pivots thereof, a load carrier having pivot brackets at its lower rear position pivotally attached to the forward ends of the side arms, the said carrier also having pivot brackets on its upper rear portion, and at least one hydraulic tilting ram pivotally connected at its forward end to the last mentioned brackets and attached at its rear end to the rear portion of the side arms.

10. In a tractor mounted material carrier and loader of the character described, the combination comprising side beams for mounting alongside the tractor, upright side bars secured on the side beams, a tubular cross member joining the upper ends of the side bars, cross braced and trussed side arms having tubular bearing elements at their rear ends, pivot pins joining the tubular cross member and bearing elements whereby the side arms may swing in vertical planes at their forward ends hydraulic lift cylinders supported at lower ends on the side beams and having upwardly extending piston rods pivoted to the side arms forwardly of their rear ends, and a load carrier on the forward ends of the side arms.

11. In a loader of the character described, a frame, a boom structure pivoted at its rear end to an elevated pivot point on the frame, a load carrier pivoted at a lower rear part on the forward end of the boom structure, a hydraulic lift cylinder supported in a generally upright position on the frame and having an upwardly extending piston rod pivoted to the boom structure whereby to swing the boom structure upward upon admission of fluid to the lower end of the cylinder, a hydraulic tilting cylinder attached at its rear end to the boom structure and having a forwardly extending piston rod pivoted to the rear of the load carrier above the forward end of the boom structure whereby the admission of fluid to the forward end of the tilting cylinder will tilt the carrier upward at its forward position, and the relation between the leverages of the lifting and tilting forces being such that the simultaneous admission of fluid as described to the respective cylinders will first tilt the load carrier and then swing the boom structure upward.

12. In a loader of the character described, a frame, a boom structure pivoted at its rear end to an elevated pivot point on the frame, a load carrier pivoted at a lower rear part on the forward end of the boom structure, a hydraulic lift cylinder supported in a generally upright position on the frame and having an upwardly extending piston rod pivoted to the boom structure whereby to swing the boom structure upward upon admission of fluid to the lower end of the cylinder, a hydraulic tilting cylinder attached at its rear end to the boom structure and having a forwardly extending piston rod pivoted to the rear of the load carrier above the forward end of the boom structure whereby the admission of fluid to the forward end of the tilting cylinder will tilt the carrier upward at its forward position, and the distances between the pivots for the boom structure and lifting cylinder and between the upper and lower pivots as the load carrier as well as the comparative diameters of the lifting and tilting cylinders being all so related that the simultaneous admission of fluid to the cylinders will first tilt the carrier and then swing the boom structure upward.

13. In a loader of the character described, a frame, a boom structure pivoted at its rear end to an elevated pivot point on the frame, a load carrier pivoted at a lower rear part on the forward end of the boom structure, a hydraulic lift cylinder supported in a generally upright position on the frame and having an upwardly extending piston rod pivoted to the boom structure whereby to swing the boom structure upward upon admission of fluid to the lower end of the cylinder, a hydraulic tilting cylinder attached at its rear end to the boom structure and having a forwardly extending piston rod pivoted to the rear of the load carrier above the forward end of the boom structure whereby the admission of fluid to the forward end of the tilting cylinder will tilt the carrier upward at its forward position, and the effective initial forces exerted by the respective lifting and tilting cylinders and piston rods being such that the simultaneous admission of fluid as set forth will first tilt and then elevate the load carrier.

LE GRAND H. LULL.

REFERENCES CITED

The following references are of record in the file of this patent:

UNITED STATES PATENTS

| Number | Name | Date |
| --- | --- | --- |
| 1,256,401 | Ward | Feb. 12, 1918 |
| 1,480,623 | Liebmann | Jan. 15, 1924 |
| 2,319,921 | Dooley et al. | May 25, 1943 |
| 2,338,361 | Shinn, Jr. | Jan. 4, 1944 |
| 2,387,764 | Maxwell | Oct. 30, 1945 |
| 2,391,857 | Arps et al | Jan. 1, 1946 |
| 2,394,830 | Woodin | Feb. 12, 1946 |
| 2,403,356 | Francis | July 2, 1946 |
| 2,418,251 | Drott | Apr. 1, 1947 |
| 2,418,403 | Grabske | Apr. 1, 1947 |
| 2,427,968 | Hoover | Sept. 23, 1947 |
| 2,466,878 | Davis et al. | Apr. 12, 1949 |